United States Patent [19]

Bodle et al.

[11] Patent Number: 4,653,951
[45] Date of Patent: Mar. 31, 1987

[54] ZERO FREE-PLAY JOINT FOR DEPLOYABLE SPACE STRUCTURES

[75] Inventors: John G. Bodle, San Diego; Charles C. Lungerhausen, La Mesa, both of Calif.

[73] Assignee: General Dynamics Corp./Convair Division, San Diego, Calif.

[21] Appl. No.: 764,288

[22] Filed: Aug. 12, 1985

[51] Int. Cl.⁴ ............................................. F16C 11/00
[52] U.S. Cl. ..................................... 403/92; 403/102; 403/145; 403/147; 403/149; 16/341; 343/885; 52/646
[58] Field of Search ................ 403/161, 162, 145, 147, 403/149, 92, 102, 101, 171; 16/337, 341, 342; 405/297; 182/152; 52/646, 632; 343/885

[56] References Cited

U.S. PATENT DOCUMENTS

| 260,448 | 7/1882 | Brannon | 403/147 |
| 472,483 | 4/1892 | Loomis | 16/337 X |
| 736,101 | 8/1903 | Hough | 403/12 X |
| 1,191,792 | 8/1916 | Jeffries | 403/149 |
| 2,991,097 | 7/1961 | Vanwersch et al. | 405/297 X |
| 2,991,101 | 7/1961 | Vanwersch et al. | 405/297 X |
| 2,991,102 | 7/1961 | Vanwersch et al. | 405/297 X |
| 2,991,103 | 7/1961 | Vanwersch et al. | 405/297 X |
| 4,208,162 | 6/1980 | Neitzel | 403/147 X |
| 4,435,100 | 3/1984 | Cox | 403/161 X |
| 4,527,362 | 7/1985 | Tobey et al. | 52/646 X |

FOREIGN PATENT DOCUMENTS

| 502749 | 3/1951 | Belgium | 403/102 |
| 567115 | 5/1958 | Belgium | 403/102 |
| 977123 | 7/1949 | Fed. Rep. of Germany | 403/149 |
| 2150209 | 6/1985 | United Kingdom | 16/341 |

Primary Examiner—Richard J. Scanlan, Jr.
Assistant Examiner—Todd G. Williams
Attorney, Agent, or Firm—John R. Duncan; Frank D. Gilliam

[57] ABSTRACT

A hinged butt joint for connecting struts to multijoint fittings used in space structures is disclosed as two end fittings pivoted together, one of which is bifurcated and the other having a cammed butt end extending between the bifurcation with a pivot pin through aligned openings so that the fittings are rotatable to a desired angular position. Nominal manufacturing tolerances are used throughout. A wedge is forcibly fitted into the base of the bifurcation when the fittings are colinear, and bonded to the base in that position during manufacture or assembly, to preclude freeplay in the joint under alternating compression and tension leads and to create a solid mechanical path though which load is transmitted and heat and electricity conducted.

5 Claims, 6 Drawing Figures

DEPLOYED POSITION

FIG. 4     FIG. 5

ZERO FREE-PLAY JOINT FOR DEPLOYABLE SPACE STRUCTURES

BACKGROUND OF THE INVENTION

This invention relates generally to hinges and more specifically to pin type hinge joints for large deployable space structures and has for its primary purpose the elimination of all post-deployment free-play in the hinge joints of such space structures and to provide a low resistance path for thermal and electrical conductivity across these joints.

There are numerous examples of hinged joints in the prior art as shown, for example, in the U.S. Pat. No. 2,991,102 to Vanwersch et al., for connecting beams of a roof support, the U.S. Pat. No. 4,286,353 to Roche for connecting structural member to prevent accidental collapse thereof, and more complex hinges are shown in the U.S. Pat. No. 3,599,164 to Ottersdorf.

All of these patented hinges completely ignore the problem of eliminating free-play in any structures let alone providing low resistance path for thermal and electrical conductivity. This is, of course, to be expected since none of the patents were involved in the deployment of space structures, etc., and did not address the problem that arose where finite clearances in pin joints, required to allow free rotation of the joint, precluded good electrical and thermal conductivity throughout the structure, nor did they address the problem of an accumulation of thousands of these finite clearances which would create significant free displacement of the structure at the extremities, upon depolyment.

It would seem that, if anything, the prior art tended toward more complex, more expensive, heavier hinge joints rather than toward simpler, less expensive and lighter hinge joints, which is the primary purpose of this invention.

Stated another way, advantages of this simple wedged butt joint are as follows:
 a. lightweight because the size of the joint is minimized and additional material for bonding straps and precision bearings is not required;
 b. low cost because of its conventional manufacturing techniques, normal pin hole tolerances and use of less material; and
 c. simple maintainability because standard easily removed bolts are used for hinge pins.

SUMMARY OF THE INVENTION

A wedged hinged butt joint is provided and method of fabrication included where two end fittings pivoted together to connect two struts or longeron tubes such as used in space trusses. One, a bifurcated end fitting, is provided with a pair of spaced apart walls each having an opening in alignment with the opening in other wall and, two, a fitting having cammed butt end extending between the spaced apart walls of the first fitting with an opening aligned with the openings in spaced walls. A pivot pin extends through the aligned openings so that the first and second fittings are rotatable to a desired angular position with respect to one another so that the struts forming a deployable space structure may be collapsed and deployed. A wedge is forcibly fitted into the base of the bifurcation when the fittings are colinear (struts deployed) during manufacture or assembly, but neither the cam nor the wedge interfere with the turning of the hinges for collapse or deployment of the structure. The wedge is bonded to the base of the bifurcation during this assembly to retain the wedge in the proper position while the hinge is operated. When the structures are deployed, the cammed butt end engages the wedge, which forces the fittings hard against the pin joint to create a solid mechanical path through which load is transmitted and heat and electricity are conducted.

BRIEF DESCRIPTION OF THE DRAWINGS

FIG. 4 is a side view of the butt joint in retracted position; and

FIG. 5 is an end view of the butt joint 45° from the view of FIG. 4.

DETAILED DESCRIPTION OF THE DRAWINGS

Figure 1:
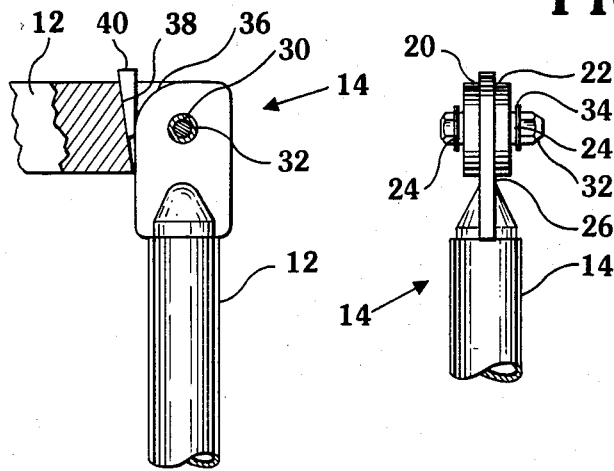
FIG. 1 illustrates a relatively large deployable space truss, partially deployed, and thus showing both deployed and retracted struts.
Figure 1:
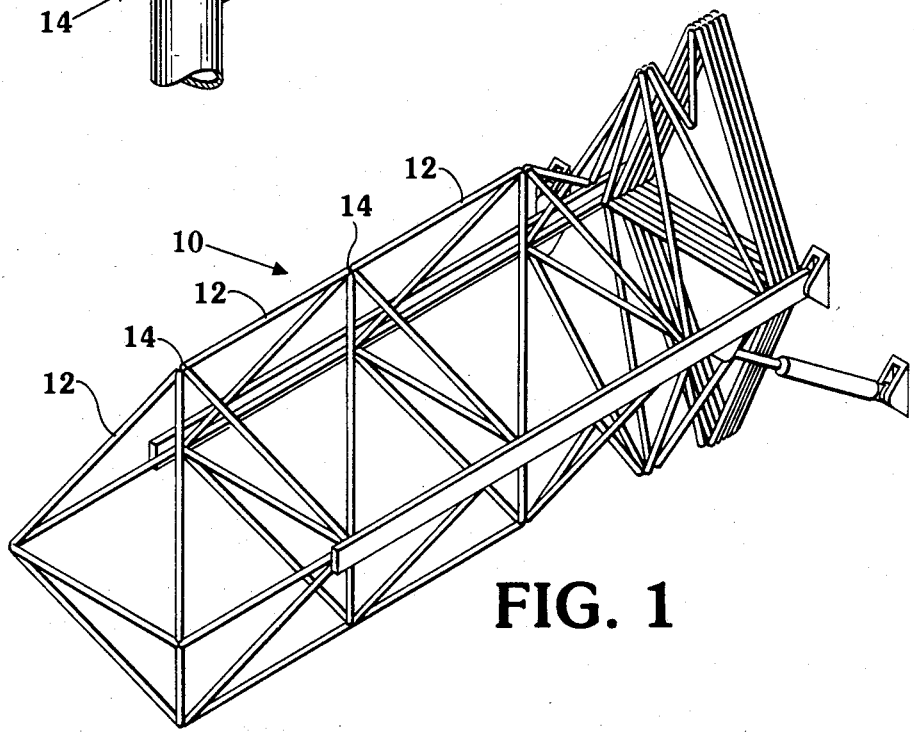

In the drawings, FIG. 1 illustrates a large deployable space truss 10 as a space structure comprising a plurality of tubular struts or longeron tubes 12 and multijoint fittings joined together by a plurality of pin type hinge joints 14 of this invention. The space truss 10 is shown with some of the trusses and joints in deployed position and with others in retracted position. This Figure also shows dramatically that with so many joints, unless the clearances in the joints required for joint rotation are negated, there would normally be significant free displacements at the extremities of the truss which can reach lengths of tons of meters. This deficiency among others in the prior art joints are corrected by this invention.

FIGS. 2-5 illustrate one such butt hinge joint 14 constructed in accordance with this invention.

Figure 2A:
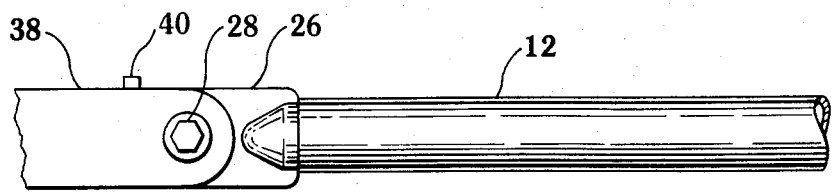
FIG. 2A is a side view of the butt joint constructed in accordance with the teachings of this invention.
Figure 2B:
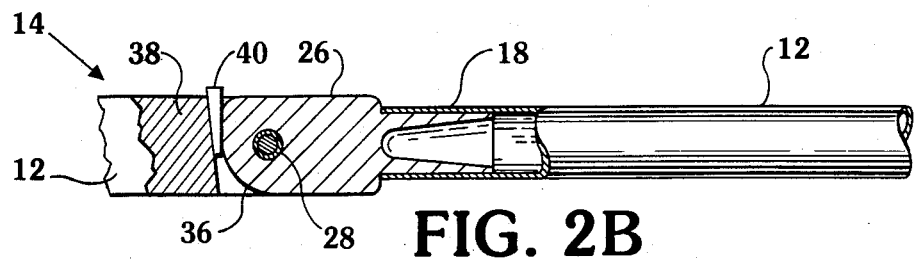
FIG. 2B is a cut-away showing of the butt joint of FIG. 2A.
Figure 3:
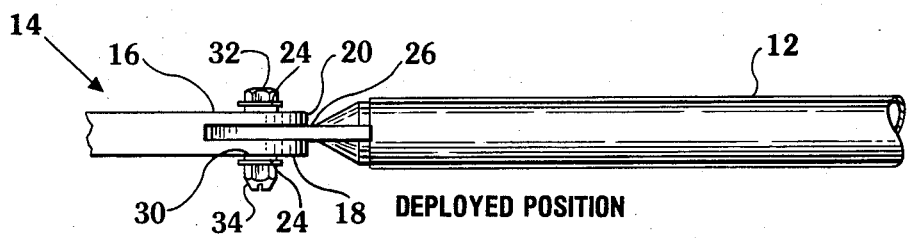
FIG. 3 is a top view of the butt joint 45° from the view of FIG. 2.

Thus, FIGS. 2A, 2B and 3 show the invention with two struts typically hollow and of graphite epoxy in a deployed position, that is, the two struts are shown axially aligned (colinear) with two end fittings 16 and 18 bonded to ends of the struts. The end fittings, of course, form the butt joint 14 of this invention with the ends which are bonded to the struts being internally tapered to received the complimentary tapered ends of the struts.

One end fitting 16 is bifurcated and thus provided with a pair of spaced apart parallel walls 20 and 22 each having an opening (bore) 24 (shown) in phantom in FIG. 3) in alignment with each other. The second fitting 18 has a plate 26 forming a butt end extending into the space between the two walls 20 and 22. This plate 26 also has a bore 28 and each bore is provided with a bushing 30, preferably of graphite epoxy, press fitted therein. When the bore 28 is brought into alignment with the two bores 24 in the bifurcated end fitting, a threaded bolt 32 (hinge pin) is inserted through the three bushings and provided with a threaded nut 34 to fasten the butt joint together.

The butt end is formed with a cam surface 36 with the largest radius relative to bore 28 closest to the base 38 of the bifurcation in the deployed position. The base 38 is shown inclined with respect to the main axis of the fitting and in this position and in accordance with the teachings of this invention, a wedge 40, typically of graphite epoxy, is positioned forcibly between the base 38 and the cam surface 36 and then bonded to the base. The inclination of the base 38 serves two purposes. Its inclined angle is the same as the angle on the wedge so that fittings are maintained in axial alignment within the wedge installed. It also provides a surface for bonding the wedge in place during the installation procedure. This cammed butt end wedge forces the clearances of the hinge pin against the respective side walls of the bushings 30 providing a solid mechanical path through which load is transmitted and heat and electricity are conducted. After the wedge has been bonded to the fitting, the hinge joint is then be retracted. For this, the cammed surface 36 allows freedom of movement without interference from the wedge as shown in FIGS. 4 and 5.

For space vehicles, this space truss utilizing this invention can then be retracted or collapsed as shown in FIG. 1 and deployed at the appropriate time.

From the foregoing it can be seen that this invention is assembled in the deployed position, i.e., the struts are colinear so that the wedge can be precisely fitted and to provide the necessary force to force the wedge 40 hard against the hinge pin. This provides the aforementioned solid mechanical joint with electrical and thermal conductive properties.

The joint can be fabricated with finite clearances utilizing conventional manufacturing techniques with nominal pinhole machining tolerances and is thus inexpensive to manufacture. The bolts are standard and easily removable and the joint is lightweight because the size is minimized and additional material for bonding straps and precision bearings is not required.

What is claimed is:

1. A butt hinge joint for rotatably connecting a pair of struts and multijoint fittings together comprising:
   an end fitting on one strut said end fitting having spaced apart sidewalls with a base therebetween and aligned bore through each sidewall;
   a second end fitting on a second strut and having an end plate inserted between said sidewalls and provided with a bore positioned in alignment with said bores of said sidewalls;
   pivot means inserted through all of said bores to form a rotatable joint; and
   a wedge bonded to said base fitted so as to engage said end plate in tight relationship when said struts are positioned colinear, thereby forcing said pivot means against said bores to provide a tight fit.

2. The hinge joint as claimed in claim 1 wherein said end plate is provided with a camming surface which engages said wedge when said struts are colinear and which allows freedom of movement for turning the hinge joint to allow said struts to assume an angular position with respect to each other.

3. The hinge joint as claimed in claim 2 wherein said base between said sidewalls of said end fitting is inclined at its wedge attachment surface.

4. The hinge joint as claimed in claim 3 wherein said struts are part of a space structure and said struts and fittings are graphite/epoxy.

5. The hinge joint as claimed in claim 4 wherein said pivot means includes bushings in each bore and a bolt extending through all bushings.

* * * * *